United States Patent
Brøns et al.

(10) Patent No.: US 12,123,797 B2
(45) Date of Patent: Oct. 22, 2024

(54) METHOD AND A SYSTEM FOR ESTIMATING THE TENSION OF A TENSION MEMBER

(71) Applicant: Danmarks Tekniske Universitet, Kongens Lyngby (DK)

(72) Inventors: Marie Brøns, Kongens Lyngby (DK); Jon Juel Thomsen, Kongens Lyngby (DK)

(73) Assignee: Danmarks Tekniske Universitet, Kongens Lyngby (DK)

( * ) Notice: Subject to any disclaimer, the term of this patent is extended or adjusted under 35 U.S.C. 154(b) by 178 days.

(21) Appl. No.: 17/795,090

(22) PCT Filed: Jan. 27, 2021

(86) PCT No.: PCT/DK2021/050027
§ 371 (c)(1),
(2) Date: Jul. 25, 2022

(87) PCT Pub. No.: WO2021/151444
PCT Pub. Date: Aug. 5, 2021

(65) Prior Publication Data
US 2023/0048801 A1  Feb. 16, 2023

(30) Foreign Application Priority Data
Jan. 31, 2020  (EP) .................................... 20154878

(51) Int. Cl.
*G01L 5/04* (2006.01)
*G01L 1/10* (2006.01)
*G01M 7/02* (2006.01)

(52) U.S. Cl.
CPC .............. *G01L 5/042* (2013.01); *G01L 1/10* (2013.01); *G01M 7/02* (2013.01)

(58) Field of Classification Search
CPC . G01L 1/10; G01L 5/042; G01L 1/103; G01L 1/106; G01M 7/02
See application file for complete search history.

(56) References Cited

U.S. PATENT DOCUMENTS

| 4,062,229 A | * | 12/1977 | Godfrey | ............... G01H 13/00 73/778 |
| 4,709,182 A | * | 11/1987 | Wenske | ............... B23P 19/033 310/317 |
| 2011/0130975 A1 | | 6/2011 | Cesare et al. | |

FOREIGN PATENT DOCUMENTS

| CN | 105571763 B | 8/2018 |
| SU | 509798 A1 | 4/1976 |
| WO | WO-2017/203220 A1 | 11/2017 |

OTHER PUBLICATIONS

International Search Report and Written Opinion for PCT/DK2021/050027, dated Apr. 28, 2021, 8 pages.

* cited by examiner

*Primary Examiner* — Paul M. West
(74) *Attorney, Agent, or Firm* — Blank Rome LLP

(57) ABSTRACT

Disclosed is a method for estimating the tension of a tension member (1), the method comprising the steps of exciting the tension member (1) such as to induce vibration of the tension member (1), sampling the vibration to obtain a first vibration signal (VS1), modifying the mass and/or the rotational inertia of the tension member (1) such as to provide a modified tension member (1a), exciting the modified tension member (1a) such as to induce vibration of the modified tension member (1a), sampling the vibration of the modified tension member to obtain a second vibration signal (VS2), and estimating the tension of the tension member based on a comparison of the first vibration signal (VS1) and the (Continued)

Figure 1B:
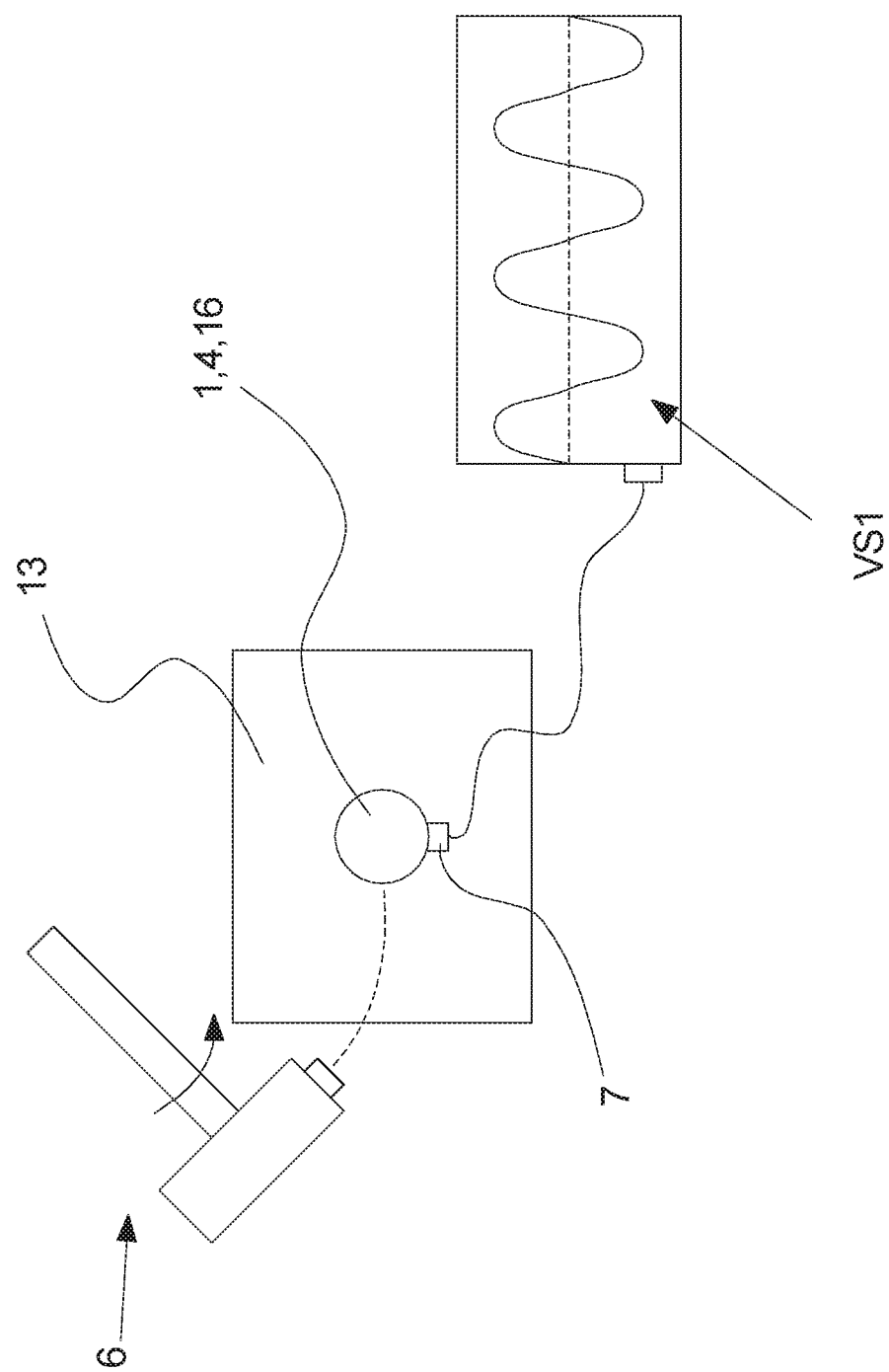

second vibration signal (VS2). Disclosed is also a system for estimating the tension of a tension member.

17 Claims, 6 Drawing Sheets

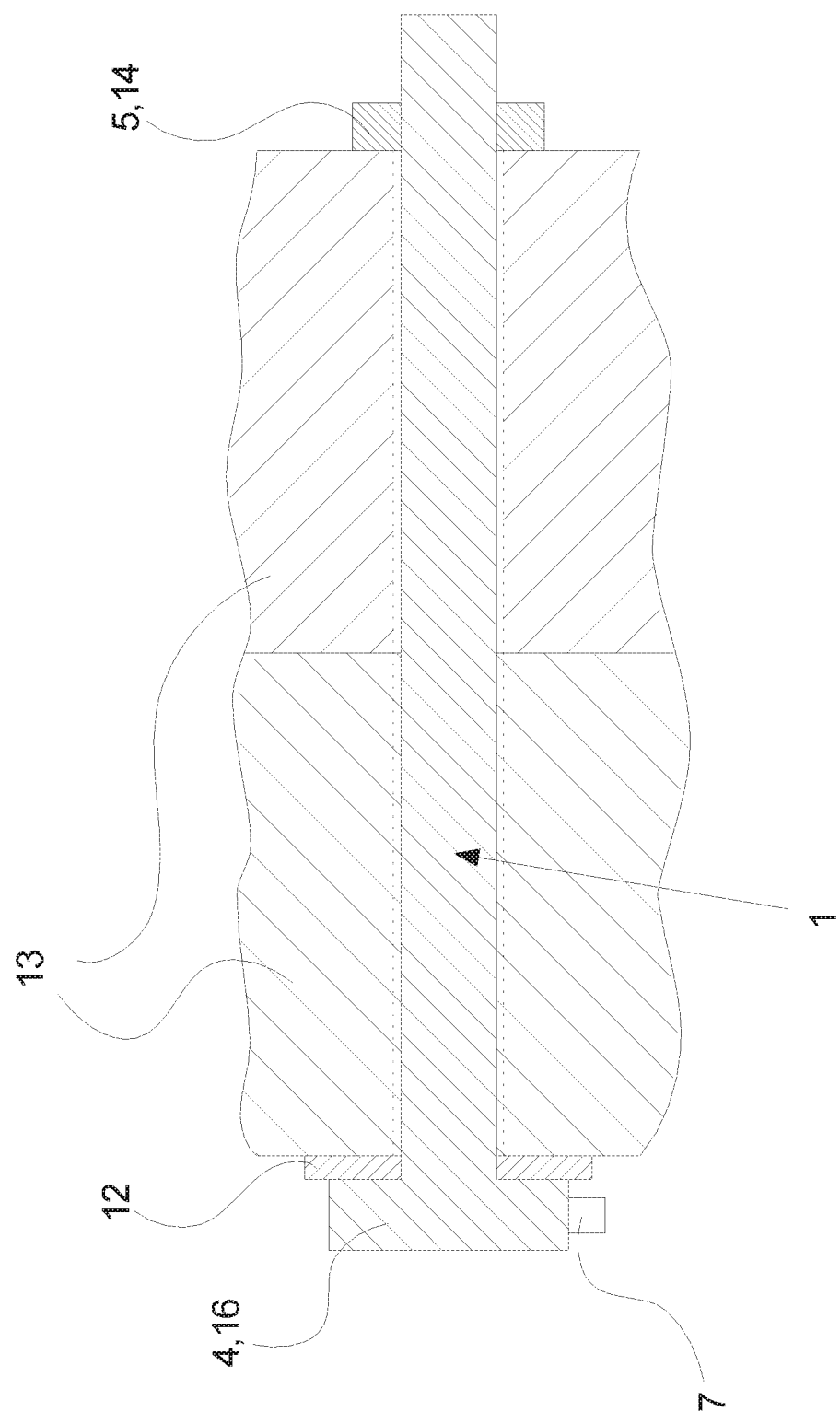

METHOD AND A SYSTEM FOR ESTIMATING THE TENSION OF A TENSION MEMBER

RELATED APPLICATIONS

This application is a national phase of PCT/DK2021/050027, filed on Jan. 27, 2021, which claims priority to European Patent Application No. EP 20154878.1, filed on Jan. 31, 2020. The contents of these applications are hereby incorporated by reference in their entirety.

FIELD OF THE INVENTION

The invention relates to a method for estimating the tension of a tension member based on vibration signals. Furthermore, the invention relates to a system for estimating the tension of a tension member.

BACKGROUND OF THE INVENTION

Many engineering structures are held together by tension members. Such tension members are pre-tensioned to a certain degree so that the structure is held together by the axial force in the tension member. However, in some cases, the tension member may loosen due to vibrations of the structure, erroneous under-tightening from the beginning, thermal effects or other. Thus, it is important to be able to estimate the tension of the tension member at any point in the lifetime of the structure.

Thus, from WO 2017/203220 A1 it is known to sense the tensile load on a nut and bolt assembly by use of a magnetic field.

However, a problem with sensing tensile load on a nut and bolt assembly as described in the prior art is that it is relatively complex and prone to errors. It is therefore an object of the present invention to address these problems.

SUMMARY OF THE INVENTION

Disclosed is a method for estimating the tension of a tension member, the method comprising the steps of:
  exciting the tension member such as to induce vibration of the tension member
  sampling the vibration to obtain a first vibration signal
  modifying the mass and/or the rotational inertia of the tension member such as to provide a modified tension member
  exciting the modified tension member such as to induce vibration of the modified tension member
  sampling the vibration of the modified tension member to obtain a second vibration signal, and
  estimating the tension of the tension member based on a comparison of the first vibration signal and the second vibration signal.

It is advantageous to estimate the tension of a tension member by exciting the tension member before and after the tension member has been modified and afterwards compare the sampled vibrations signals in that it is possible to estimate the tension of any bolt without keeping track of its history, i.e. prior tension and load history. Therefore, keeping track of the bolt state in e.g. a database is not necessary as it is sufficient to just know the type of bolt (length, thickness, bolt quality etc) which is usually directly available on-site. This is advantageous in that possible errors by maintenance personnel are mitigated so that erroneous estimation of tension is avoided which could lead to false perception of the integrity of the structure being held together by such a tension member.

Estimating the tension of the tension member may be performed by modelling the tension member as a beam model, e.g. according to Euler-Bernoulli beam theory or Timoshenko beam theory. Modelling the tension member according to any of such theories requires the knowledge of certain parameters, which take into account a mixture of the set-up of the beam model, dimensions, material and other. These parameters are included in the equations which describe the deformations and vibrations of such beams. However, determining these parameters may be relatively difficult due to the number of available equations to solve the unknown parameters (i.e. boundary stiffness and axial tension). Thus, by modifying the tension member so that the mass and/or rotational inertia is slightly altered, it is possible to affect the vibration characteristics without significantly altering the boundary stiffness and tension of the tension member so that the behaviour of the tension member does not deviate too much from the mathematical model.

It should be noted that the vibration signal could comprise transverse bending vibrations, longitudinal vibrations and torsional vibrations. Thus, the vibration signal could comprise a mixture of these types of vibrations.

The term "tension member" should be understood as a bolt, a stud, a cable, tension rod, rivet or other type of tension member which may clamp or support at least two elements due to the tensile load on the tension member. A stud is a rod that is threaded on both ends; the thread may extend along the complete length of the rod. Nuts can then be attached to both ends of the stud.

The sampling could be performed by sampling of accelerations (e.g. by use of accelerometer), velocity, displacement, audio signals or other.

In an embodiment of the invention, the tension member is modified by modifying the mass and/or rotational inertia at the boundaries of the tension member.

As explained above, the tension member may be modelled by use of a suitable beam model. Such a beam model requires various boundary conditions being representative of the actual physical constraints.

Modifying the mass and/or rotational inertia at the boundaries is advantageous in that it is possible to change vibrational response from the tension member without affecting the boundary stiffness and tension of the tension member and without introducing new unknown parameters into the set of equations. Thus, it is possible to compare the vibration signals (one with and one without the modification) more easily so that the tension of the tension member may be estimated.

In an embodiment of the invention, the step of modifying the tension member comprises increasing the mass between 5 and 80 percent, preferably between 7 and 70 percent and most preferred between 10 and 50 percent of the mass of the tension member.

If the modification increases the mass of the tension member too much, the physical behaviour (e.g. axial tension and boundary stiffness) may be severely affected and if the modification increases the mass of the tension member too little, the effect of the modification may not be distinct enough so that a clear distinction between the two vibration signals is not possible, i.e. the difference may "drown" in signal noise. Thus, the above-mentioned range represents an advantageous relationship between ease of signal processing and accurate mathematical representation.

In an embodiment of the invention, the mass or the rotational inertia of the tension member is modified by attaching a mass on a first end and/or a second end of the tension member.

The calculations required to estimate the tension in the tension member are simpler if the mass is attached to an end of the tension member e.g. because the location of an end of the tension member is always well defined whereas locating the mass between the ends would also require further measurements and calculation adjustments in relation to the specific location. Furthermore, it is advantageous if a mass is attached to either of the ends of the tension member in that it provides for an easy way of modifying the tension member by simply adding a mass to the ends. This mass could be screwed, glued, welded, clamped or in any other ways attached to either of the ends of the tension member.

It should be emphasized that "a mass" could be a nut, a washer, a threaded block, a lump mass or anything else that may be attached to the tension member so that the mass is increased at one or both of the ends of the tension member.

It should be noted that the mass should be attached to the ends so that it may vibrate together with the tension member—however, without altering the physical behaviour of the tension member. The attached mass should only affect the boundary stiffness and/or rotational inertia.

In an embodiment of the invention, the boundary conditions of the first end and the second end of the tension member are asymmetric when the mass and/or the rotational inertia of the tension member is modified.

It is advantageous if the boundary conditions at the ends of the tension member asymmetric (i.e. the first end boundary conditions are different from the second end or vice versa) in that it is thereby easier to mathematically distinguish between the ends of the tension member so that an accidental substitution may be avoided. Furthermore, by doing so, it is possible to obtain a mathematical model which may easier and faster converge towards a (correct) solution where the boundary stiffnesses have not been switched (this would not correspond to reality and result in erroneous theoretical vibration signal).

In an embodiment of the invention, the estimation is performed by use of a non-linear regression model.

The estimation may be performed by using an error function, which minimizes the error between a set of guessed parameters and a new estimate. This error function may be minimized (in order to converge towards a solution) by use of a non-linear regression model.

Since the relationship between the theoretical vibration signal (i.e. natural frequency) and the boundary stiffness and tension, the error function is also non-linear. Thus, it is advantageous to use a non-linear regression model for solving the set of equations in that the error function is minimized by successive iterations.

The non-linear regression model could be an exhaustive search algorithm, non-linear least squares, Gauss method of minimization or any other type of non-linear regression model which may be used to minimize an error function by an iterative procedure.

In an embodiment of the invention, estimation is performed by use of a Gauss method of minimization.

It is advantageous to use a Gauss method of minimization (or Gauss-Newton algorithm) in that only first derivates are needed—i.e. second derivates, which are harder to compute, are not required.

In an embodiment of the invention, the step of modifying the tension member comprises an increase of the rotational inertia of between 0.1 and 10 percent, preferably between 0.5 and 8 percent and most preferred between 1 and 5 percent of the rotational inertia of the tension member.

If the modification increases the rotational inertia of the tension member too much, the physical behaviour (e.g. axial tension and boundary stiffness) may be affected and if the modification increases the rotational inertia of the tension member too little, the effect of the modification may not be distinct enough so that a clear distinction between the two vibration signals is not possible, i.e. the difference may "drown" in signal noise. Thus, the above-mentioned range represents an advantageous relationship between ease of signal processing and accurate mathematical representation (free body diagram of the tension member).

In an embodiment of the invention, the tension member is a bolt or a stud.

It is advantageous if the tension member is a bolt or a stud because such tension members are widely used in engineering structures and machine design for providing a firm connection between two structures. Furthermore, bolts and studs are specifically designed to be used as tension elements in that they are usually preloaded with some pretension. Even further, the threaded parts of the bolt or stud makes it easy to attach additional mass, exciting means, sampling means or other tightly and securely to the tension member.

Furthermore, it is advantageous if the tension member is a bolt in that the bolt may be represented by beam models and is therefore suitable for the method according to the present invention.

In an embodiment of the invention, the tension member is excited with a piezoelectric plate or an impact hammer.

It is advantageous if the tension member is excited with a piezoelectric plate or an impact hammer in that a precisely timed excitation may be performed. Furthermore, the precise impact force may be used to excite the tension member so that the right vibration response is obtained. The right vibration response is understood as the vibration response wherein the theoretical vibration signal is expected to be. Furthermore, since the electrical charge measurable in a piezoelectric device is directly related to the applied force and thereby the acceleration (Newton's second law of motion), using such a device is advantageous in that it is possible to precisely excite the tension member with the needed force.

In an embodiment of the invention, the first vibration signal and/or the second vibration signal is sampled by use of an accelerometer or a piezoelectric plate.

This is advantageous in that precise and accurate sampling may be performed. Furthermore, piezoelectric elements provide an inexpensive, durable and reliable way of sampling the first vibration signal and/or the second vibration signal in that piezoelectric elements provides an output signal in volts by means of which the natural frequency easily can be identified.

In an embodiment of the invention, the first vibration signal and the second vibration signal are the transverse bending natural frequency.

It is advantageous if the first and the second vibration signal is the transverse bending natural frequency in that this bending frequency is the easiest to obtain large amplitude vibrations due to the typical slenderness of a tension member. Furthermore, it is possible to calculate a theoretical transverse bending natural frequency which may then be correlated with the actual measurements. Thus, it is advantageous if the vibration signals are the transverse bending natural frequency in that it is easier to "tune" into the right frequency range since it is calculated before-hand and one may know at which frequency range the natural frequency is expected to be located in.

Another advantageous aspect is that the transverse bending natural frequency is related to the axial tension. Therefore, measuring the transverse bending natural frequency may be correlated to the axial load and therefore the tension in the tension member.

In an embodiment of the invention, the tension member is pre-tensioned with a pre-stress of between 30 and 90 percent, preferably between 50 and 85 percent and most preferred between 60 and 80 percent of the yield strength of the tension member.

The vibration response is related to the tension of the tension member in such a way that the amplitude is dependent on the tension of the tension member. Thus, if the tension is low, the damping is high whereas if the tension is high, the damping is low. It is important that the damping is not too high as this would make the relationship between the tension and vibration response non-linear, which is not desired as the mathematical beam model is a linear model—more specifically, the transverse natural frequencies should not be amplitude dependent. However, the tension in the tension member may also not be too high as this could potentially damage the tension member.

Thus, the above-mentioned ranges present an advantageous relationship between representative mathematical model and practical implementation.

In another aspect of the invention, the invention provides for a system for estimating the tension of a tension member, the system comprising excitation means for inducing vibrations on the tension member, sampling means for sampling the vibrations of the tension member when said excitation means excite said tension member, mass modifying means arranged for modifying the mass and/or inertia of the tension member, and processing means arranged for comparing the sampled vibrations and thereby estimate the tension of the –tension member.

It is advantageous to provide for a system for estimating the tension of a tension member as described above in that it is easier for e.g. maintenance personnel to check whether or not a tension member is sufficiently tensioned.

"Excitation means" should be understood as a piezoelectric plate, impact hammer, piezoelectric actuator or other type of exciter.

"Sampling means" should be understood as accelerometers, piezoelectric plate or element, velocity sensor or other type of sampler.

"Mass modifying means" should be understood as any type of mass modifier capable of modifying the tension member by modifying the mass or rotational inertia by e.g. adding a nut, removing material at the boundaries, adding a lumped mass or other.

"Processing means" should be understood as a computer, a processing unit, a mechanical processing unit, a software for processing data or any other type of processor.

In an embodiment of the invention, the system is arranged to perform the method according to any of the previously described methods.

This is advantageous in that the system is specifically designed to carry out the previously described methods so that the tension of a tension member may be determined by carrying out said method.

The system could be a device including the excitation means, sampling means, mass modifying means, processing means in a single cabinet which is transportable by the personnel who may perform the inspection of the tension.

It could also contain only some of the above means, e.g. only the excitation and sampling means so that the operator may communicate with an external unit which may process and estimate the tension. This unit could for example be a laptop, smartphone, tablet or other smart interface device which the operator may carry around from site to site. Furthermore, to limit for example battery consumption on the system or device, the system/device may communicate with an external unit which may perform the estimation which requires some computation power.

The system or device may be arranged to estimate the tension of the tension member one by one or multiple tension members at once so that the process of estimating a plurality of tension members is sped up.

In an aspect the method further comprises checking if the estimated tension of the tension member is within a predefined tension range.

Using the present method to estimate the tension in e.g. studs connecting the tube elements of a wind turbine tower is typically done to confirm whether or not the tension of each tension member is within a predefined tension range—i.e. to check is the tension member are functioning correctly in relation to ensuring a safe tower connection. Thus, it is advantageous to make the method according to the present invention comprise checking if the estimated tension of the tension member is within a predefined tension range in that it hereby is possible to provide an output signal—e.g. a visual or audio signal to an operator—regarding the tension state of the specific tension member, which will enable the operator or other to correct the tension state—if this is not correct—immediately or at least mark the tension members that subsequently needs tension adjustment.

In an aspect of the invention, a computer program is provided for estimating the tension of a tension member, comprising instructions which when the program is executed by a computer causes the computer to carry out the following steps sampling a vibration of an excited tension member to obtain a first vibration signal, sampling a vibration of a mass modified or rotational inertia modified tension member to obtain a second vibration signal, estimating the tension of said tension member based on a comparison of the first vibration signal and the second vibration signal, and providing an output of the estimated tension of the tension member.

The computer may preferably comprise memory and a processor to execute the computer program using the memory. The computer program may have access to a cloud solution for retrieving tension member properties (dimensions, type, material etc.) and also for outputting and storing the tension estimates.

Furthermore, the invention also relates to use of a method according to any of the previously discussed methods for estimating the tension of a bolt or a stud.

Using the method according to the present invention in relation to bolts or studs is particularly advantageous in that these elements are very standardized and thereby particularly suited for the present method. Furthermore, the threaded parts of the bolts or studs make it easy to attach additional mass, exciting means, sampling means or other tightly and securely to the tension member.

For a more complete understanding of the disclosure, reference is now made to the following brief description of various combinable embodiments of the invention.

FIGURES

Figure 2A:
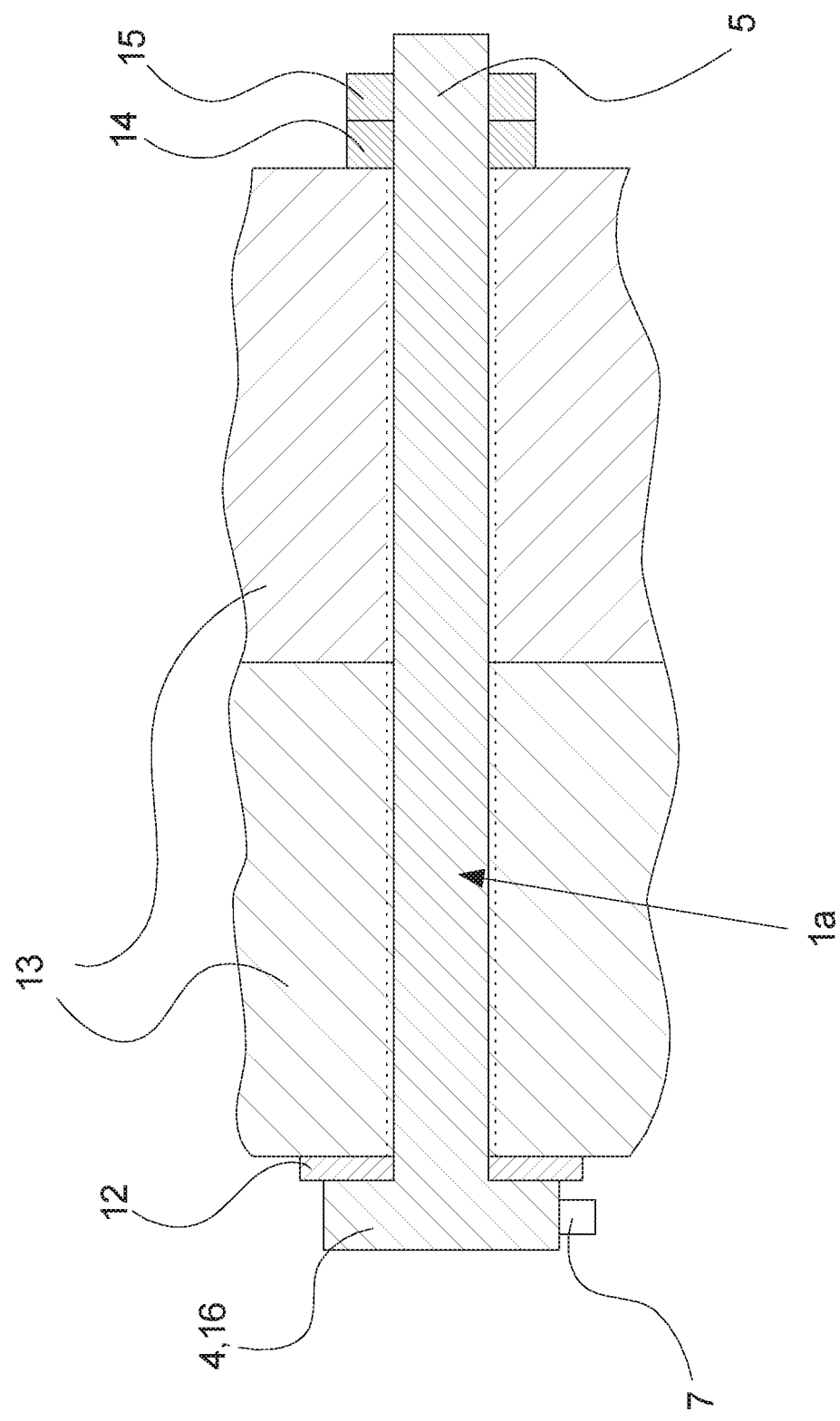
Figure 2B:
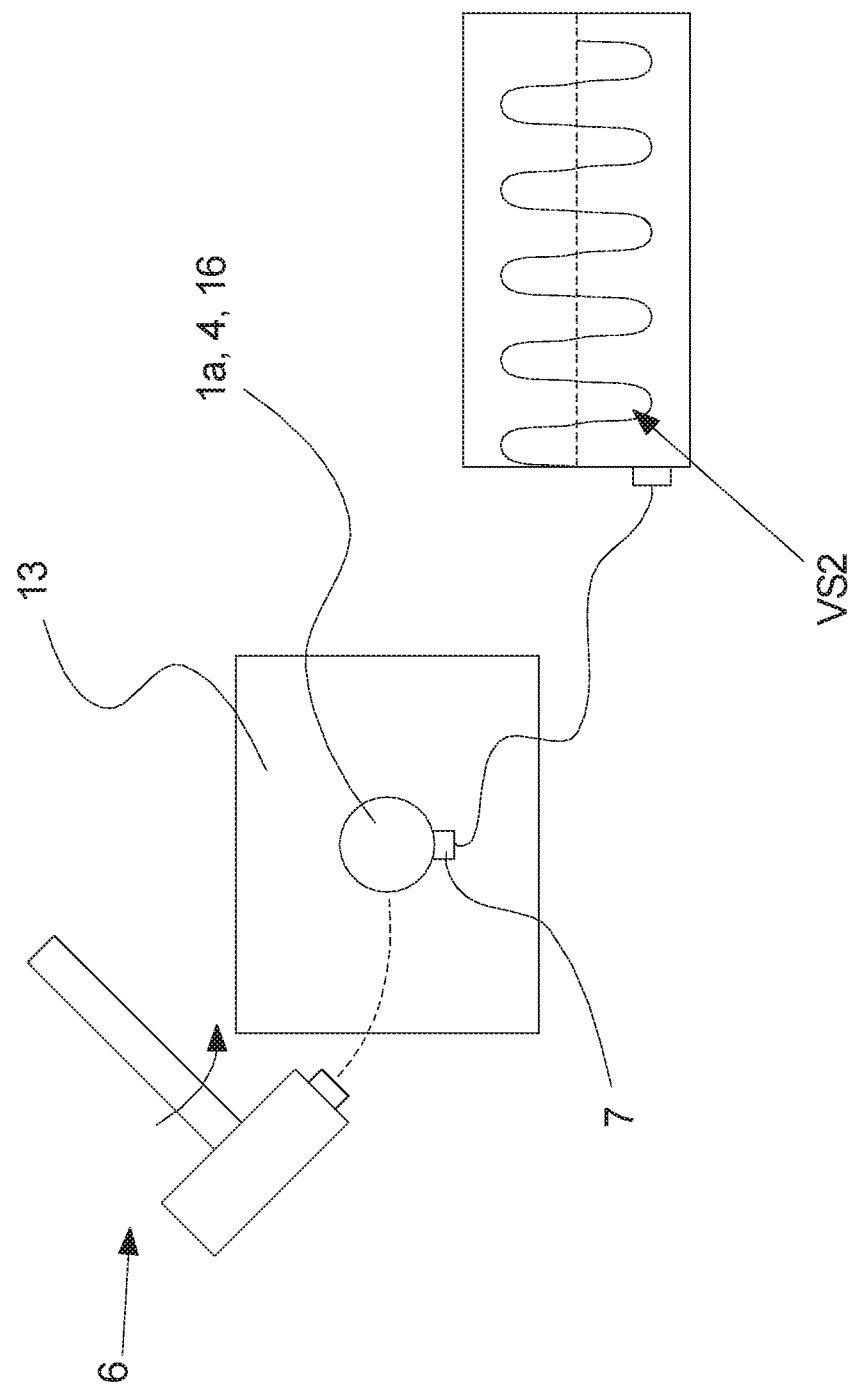
Figure 3:
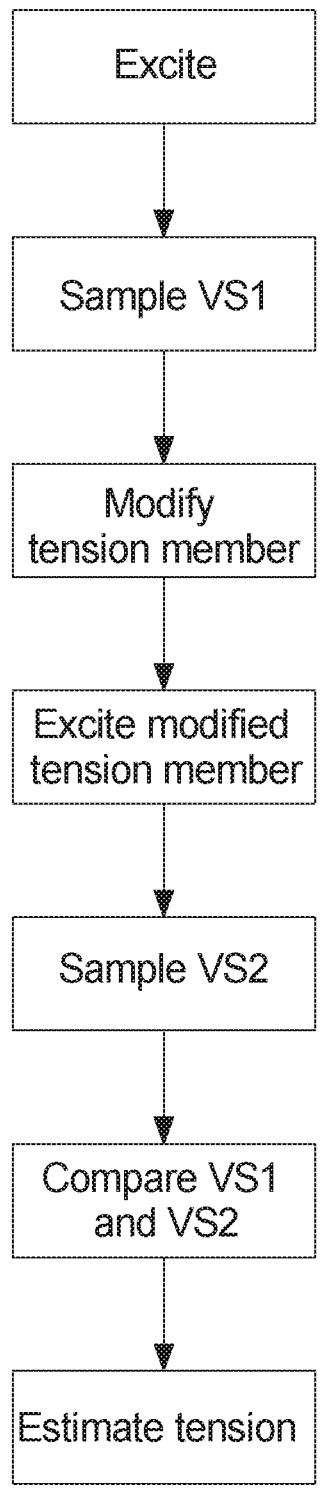
Figure 4:
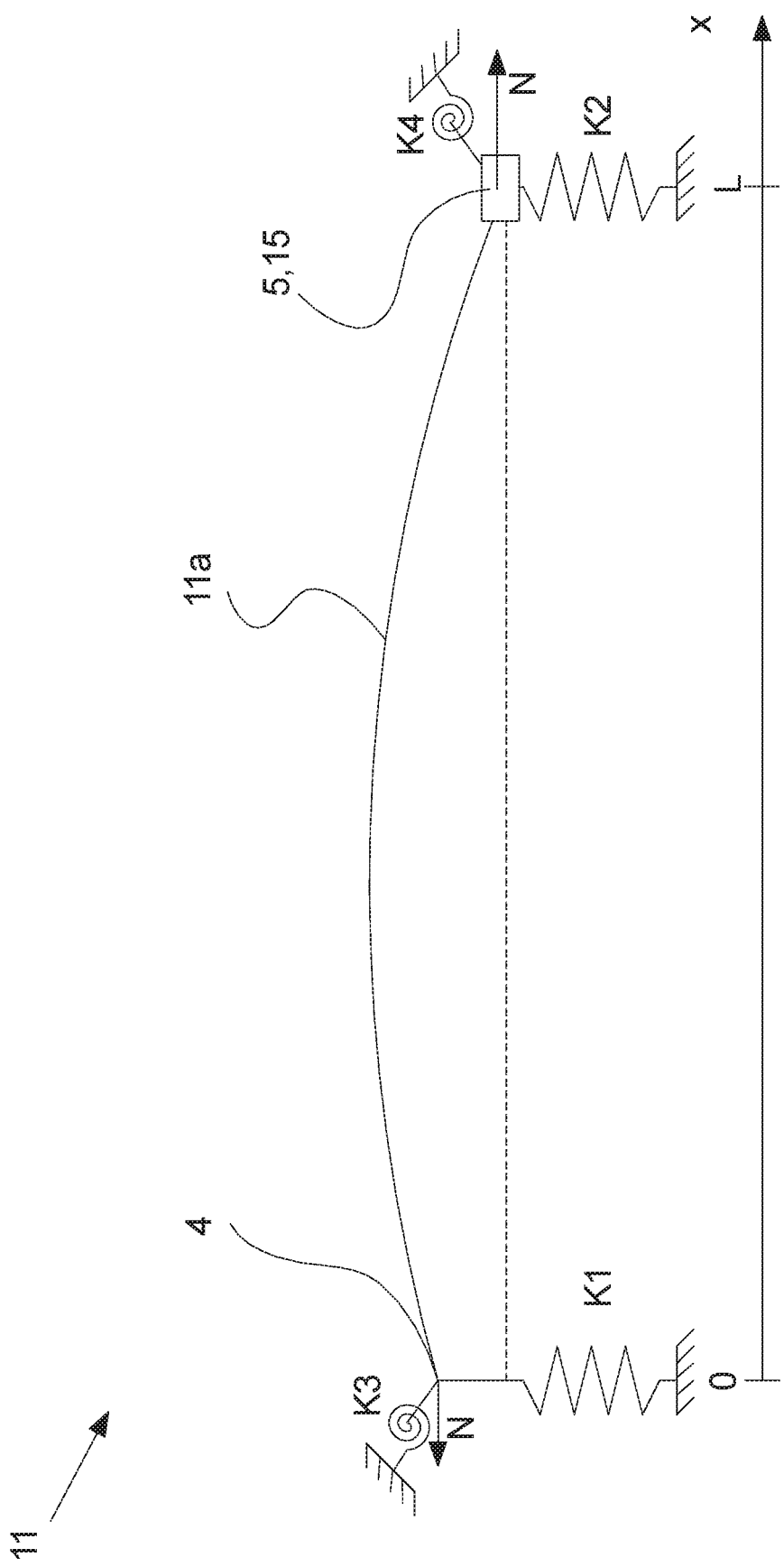

FIG. 1a illustrates a tension member clamping two elements together as seen from the side, FIG. 1b illustrates a tension member being excited as seen from the front, FIG. 2a illustrates a modified tension member clamping two elements together as seen from the side, FIG. 2b illustrates a modified tension member being excited as seen from the front, FIG. 3 illustrates the steps of estimating the tension of a tension member, and FIG. 4 illustrates a free-body-diagram of a tension member modelled as a beam.

DETAILED DESCRIPTION

FIG. 1a illustrates a tension member 1 clamping two elements 13 together as seen from the side.

The figure also illustrates a typical application of a tension member 1. The working principle is that the tension member 1 is subjected to an axial pre-tension so that the material elasticity results in a clamping force on the elements 13 and thereby holds the elements 13 together. The bolted elements 13 may be parts of an engine, wind turbine, bridge or any other engineering construction involving bolted joints or members being connected by a tension member.

The tension member may comprise a nut 14 and a tension member head 16 so that a moment may be applied to it so as to produce the axial tension.

In this embodiment, the structure also comprises a force washer 12 for sensing the applied load as the setup is also a test rig for the purpose of carrying out the invention. However, it is obvious that the force washer is not necessarily present or may be replaced by a regular washer.

Furthermore, in this embodiment, the tension member 1 is an M12 bolt. However, in another embodiment, other type of bolts may be used as well as other types of tension members as previously mentioned. I.e., in another embodiment the tension member 1 could be an anchored bolt or stud where only one end of the tension member is accessible or the tension member 1 could be a stud with nuts attached at one or both ends.

The tension member depicted in the figures is relatively slender. It should be noted that the slenderness ratio is preferably between s=30 and s=80—such as s=40, s=50 or s=60. However, in another embodiment the slenderness ratio could be less than s=20—such as s=20, s=10 or even lower—or the slenderness ratio could be more than s=80—such as s=85, s=95 or even higher.

In this embodiment the tension member 1 is pre-tensioned with a pre-stress of 60 percent of the yield strength of the tension member 1 but in another embodiment the tension member 1 could pre-tensioned with a pre-stress of 10 percent, 40 percent or even in some embodiments 100 percent of the yield strength of the tension member 1.

FIG. 1b illustrates a tension member 1 being excited as seen from the front.

In order to obtain a first vibration signal VS1 the tension member 1 is excited so that the tension member 1 vibrates. These vibrations are captured by the accelerometer 7 which measures the transverse accelerations as illustrated by the wave signal—which is not necessarily representative of an actual vibrational response of the tension member 1.

In this embodiment, the tension member 1 is excited by use of an impact hammer 6. However, in another embodiment 1 the tension member may be excited by any other excitation means as mentioned previously.

In this embodiment, the accelerometer is positioned at the first end 4. However, in another embodiment, the accelerometer may be positioned at the second end 5. Also, the impact point may be on any point of the tension member 1, however preferably on either end. Furthermore, the excitation means 6 may impact the tension member 1 from any direction (e.g. transverse, longitudinal or other, or a combination of these).

It should also be noted that in this embodiment, the accelerometer communicates by wire with a monitor (which may comprise a monitor for displaying the vibration signal), but it may also communicate wirelessly.

FIG. 2a illustrates a modified tension member 1a clamping two elements 13 together as seen from the side.

The step of modifying the tension member 1 may e.g. be performed by adding a nut 14 on the second end 5 so that the boundary mass and/or the rotational inertia is increased. As the tension member 1 in this embodiment is a bolt, the mass 14 may easily be added to the second end 5 of the bolt by simply screwing the mass 14 onto the threaded portion of the bolt. Likewise, if the tension member was a stud, the mass 14 may easily be added to the first end 4 or the second end 5 of the stud by simply screwing the mass 14 onto the threaded portion of the stud.

In this embodiment, the added mass 15 is a nut 14. However, in another embodiment, the added mass 15 could be any of the previously described mass modifying means.

FIG. 2b illustrates a modified tension member 1a being excited as seen from the front.

As illustrated in the figure, the second vibration signal VS2 is different from the first vibration signal VS1. The second vibration signal VS2 is clearly affected by the addition of the added mass 15 which, in this embodiment, affects the boundary conditions so that the vibration characteristics has been altered. Subsequently, the tension of the tension member can be estimated based on a comparison of the first vibration signal VS1 and the second vibration signal VS2 as described in the following. In another embodiment the method could further comprise the step of comparing the estimated tension of the tension member 1 with a desired tension e.g. to provide information regarding whether or not the specific tension member 1 is within the correct tension range in the specific application. I.e. in another embodiment the method could include providing input regarding the specific tension member—such at type, size, make, model, material and/or other—and e.g. the specific application or location, so that a desired tension range may be established e.g. by means of a database, a look-up table, additional input or other and so that the method includes checking if the estimated tension is within the desired tension range. The method may then further include providing a signal to the operator or others regarding whether or not estimated tension of the tension member 1 is within the desired tension range.

FIG. 3 illustrates the steps of estimating the tension of a tension member 1.

It should be noted that the ordering of the steps may be switched so that the modified tension member 1a is excited first followed by the "non" modified tension member 1. However, this is of course obvious from the method as described as the step of modification is, in essence, just a tension member modified relative to its previous state. Thus, in the case of using a nut as an added mass, the step of removing the mass is obviously also a modification.

FIG. 4 illustrates a free-body-diagram of a tension member 1 modelled as a beam.

In order to be able to estimate the tension N of the tension member 1, an appropriate mathematical model with a corresponding equation of motion must be set up. Thus, in this embodiment, the tension member is modelled as a Bernoulli-Euler beam with translational and rotational boundary springs, and an added mass 15 with a mass moment of inertia, the first end 4 being at the end where x=0 and the second end 5 being at the end where x=L.

Introducing non-dimensional quantities of the position x, deflection u(x, τ) time τ, natural frequency $\omega_o$, axial tension, stiffness $K_{1,2}$, rotational stiffness $K_{3,4}$, mass m, mass moment of inertia J and slenderness ratio s.

$$x = \frac{X}{L}, u(x,\tau) = \frac{U(X,t)}{L}, \tau = \omega_o t, \omega_o = \sqrt{\frac{EI}{\rho A L^4}},$$

$$p = \frac{NL^2}{EI} = \frac{\sigma s^2}{E}, k_{1,2} = \frac{K_{1,2} L^3}{EI}, K_{3,4} = \frac{K_{3,4} L}{EI}, m = \frac{M}{\rho A L},$$

$$J = \frac{\tilde{J}}{\rho A L^3}, s = \frac{L}{\sqrt{\frac{I}{A}}}$$

Where U(X, t) describes transverse vibrations of the beam (X being between 0 and L and t being time).

The non-dimensional Bernoulli-Euler equation of motion for deflection in transverse direction is:

$$\ddot{u}+u'''' - pu'' = 0$$

Where overdots represent differentiation with respect to non-dimensional time and primes denote differentiation with respect to non-dimensional position.

Applying the boundary conditions at x=0 and at x=L gives:

$$u'''(0,\tau) = pu'(0,\tau) - k_1 u(0,\tau),$$

$$u''(0,\tau) = k_3 u'(0,\tau),$$

$$u'''(1,\tau) = pu'(1,\tau) + k_2 u(1,\tau) + m\ddot{u}(1,\tau)$$

$$u''(1,\tau) = -k_4 u'(1,\tau) - J\ddot{u}'(1,\tau)$$

The non-dimensionalized Bernoulli-Euler equation equation of motion is solved by superposition of eigen-solutions $$u(x,\tau) = \varphi(x) e^{i\omega\tau}$$

Inserting the eigen-solutions into the non-dimensionalized Bernoulli-Euler equation equation of motion and the boundary condition equations results in a set of equations containing the unknown beam model boundary parameters $K_1$, $K_2$, $K_3$, $K_4$ and p in addition to the known end mass and rotational inertia.

In order to solve for these unknown parameters, a non-linear regression may be used to fit the parameters to measured natural frequencies (i.e. the measured natural frequencies extracted from the first and second vibration signal VS1 and VS2, respectively). An error function (based on a Maximum a Posteriori (MAP) estimation) is introduced:

$$S(\hat{p}_s) = (\omega - \hat{\omega}(\hat{p}_s))^T W(\omega - \hat{\omega}(\hat{p}_s)) + (\tilde{p}_s - \hat{p}_s)^T U(\tilde{p}_s - \hat{p}_s)$$

Where the first term is the deviation between measured natural frequencies and the model predicted undamped natural frequencies (damping may be neglected in the model since it has an insignificant effect on the natural frequency).

The second term represents the deviations between a posteriori guess of the unknown parameters contained in $\tilde{p}_s$ and new estimate $\hat{p}_s$. W and U are weighting matrices, where W indicates the confidence in the measured natural frequencies, and U the confidence in the a posteriori estimate. The other parameters in the equation are vectors.

The above error function may be minimized by use of Gauss method of minimization, setting the weight matrices and a posteriori, stop criteria and a posteriori updates and choosing new a posteriori estimates if the estimated parameters are unrealistic or do not converge towards a solution.

The invention has been exemplified above with reference to specific examples of tension member, sampling means, excitation means and other. However, it should be understood that the invention is not limited to the particular examples described above but may be designed and altered in a multitude of varieties within the scope of the invention as specified in the claims.

LIST

1. Tension member
1a. Modified tension member
2. Boundaries of tension member
3. Mass
4. First end of tension member
5. Second end of tension member
6. Excitation means
7. Sampling means
8. Mass modifying means
9. Mass modifying means
10. System for estimating the tension of a tension member'
11. Beam model
11a. Beam
12. Force washer
13. Clamped member
14. Nut
15. Added mass
16. Tension member head
K1, K2. Translational stiffness
K3, K4. Rotational stiffness
VS1. First vibration signal
VS2. Second vibration signal

The invention claimed is:

1. A method for estimating the tension of a tension member, said method comprising the steps of:
    exciting said tension member such as to induce vibration of said tension member,
    sampling said vibration to obtain a first vibration signal (VS1),
    modifying the mass and/or the rotational inertia of said tension member such as to provide a modified tension member,
    exciting said modified tension member such as to induce vibration of said modified tension member,
    sampling said vibration of said modified tension member to obtain a second vibration signal (VS2), and
    estimating the tension of said tension member based on a comparison of said first vibration signal (VS1) and said second vibration signal (VS2).

2. A method according to claim 1, wherein said tension member is modified by modifying the mass and/or rotational inertia at the boundaries of said tension member.

3. A method according to claim 1, wherein said step of modifying said tension member comprises increasing the mass between 5 and 80 percent, preferably between 7 and 70 percent and most preferred between 10 and 50 percent of the mass of said tension member.

4. A method according to claim 1, wherein said mass or said rotational inertia of said tension member is modified by attaching a mass on a first end and/or a second end of said tension member.

5. A method according to claim 4, wherein the boundary conditions of said first end and said second end of said tension member are asymmetric when said mass and/or said rotational inertia of said tension member is modified.

6. A method according to claim 1, wherein said estimation is performed by use of a non-linear regression model.

7. A method according to claim 6, wherein said estimation is performed by use of a Gauss method of minimization.

8. A method according to claim 1, wherein said step of modifying said tension member comprises an increase of the rotational inertia of between 0,1 and 10 percent, preferably between 0,5 and 8 percent and most preferred between 1 and 5 percent of the rotational inertia of said tension member.

9. A method according to claim 1, wherein said tension member is a bolt or a stud.

10. A method according to claim 1, wherein said tension member is excited with a piezoelectric plate or an impact hammer.

11. A method according to claim 1, wherein said first vibration signal and/or said second vibration signal is sampled by use of an accelerometer or a piezoelectric plate.

12. A method according to claim 1, wherein said first vibration signal and said second vibration signal is the transverse bending natural frequency.

13. A method according to claim 1, wherein said tension member is pre-tensioned with a pre-stress of between 30 and 90 percent, preferably between 50 and 85 percent and most preferred between 60 and 80 percent of the yield strength of said tension member.

14. A method according to claim 1, wherein said method further comprises checking if said estimated tension of said tension member is within a predefined tension range.

15. Use of a method according to claim 1 for estimating the tension of a bolt or a stud.

16. A system for estimating the tension of a tension member, said system comprising
    excitation means for inducing vibrations on said tension member,
    sampling means for sampling the vibrations of said tension member when said excitation means excite said tension member,
    mass modifying means arranged for modifying the mass and/or inertia of said tension member, and
    processing means arranged for comparing said sampled vibrations and thereby estimate the tension of said tension member.

17. A system according to claim 16, wherein said system is arranged to perform a method for estimating the tension of a tension member, the method comprising the steps of:
    exciting said tension member such as to induce vibration of said tension member,
    sampling said vibration to obtain a first vibration signal (VS1),
    modifying the mass and/or the rotational inertia of said tension member such as to provide a modified tension member,
    exciting said modified tension member such as to induce vibration of said modified tension member,
    sampling said vibration of said modified tension member to obtain a second vibration signal (VS2), and
    estimating the tension of said tension member based on a comparison of said first vibration signal (VS1) and said second vibration signal (VS2).

* * * * *